United States Patent
Ho et al.

(10) Patent No.: US 7,914,174 B2
(45) Date of Patent: Mar. 29, 2011

(54) METHOD TO OPTIMIZE MICRO-OPTIC LENS IN LED FLASHLIGHT APPLICATION

(75) Inventors: Chih-Chiang Ho, Hsinchu (TW); Hsiao-Wen Lee, Hsinchu (TW)

(73) Assignee: VisEra Technologies Company Limited, Hsinchu (TW)

( * ) Notice: Subject to any disclaimer, the term of this patent is extended or adjusted under 35 U.S.C. 154(b) by 321 days.

(21) Appl. No.: 12/332,696

(22) Filed: Dec. 11, 2008

(65) Prior Publication Data

US 2010/0150200 A1    Jun. 17, 2010

(51) Int. Cl.
*G02B 3/08* (2006.01)
*F21S 9/00* (2006.01)

(52) U.S. Cl. .................................. 362/257; 359/742
(58) Field of Classification Search ............ 362/311.01, 362/311.02, 257, 330; 359/742
See application file for complete search history.

(56) References Cited

U.S. PATENT DOCUMENTS

| | | | | |
|---|---|---|---|---|
| 6,473,238 B1 * | 10/2002 | Daniell | ............ | 359/622 |
| 6,587,276 B2 * | 7/2003 | Daniell | ............ | 359/622 |
| 6,721,101 B2 * | 4/2004 | Daniell | ............ | 359/626 |
| 2003/0112523 A1 * | 6/2003 | Daniell | ............ | 359/626 |

* cited by examiner

*Primary Examiner* — David V Bruce
(74) *Attorney, Agent, or Firm* — Muncy, Geissler, Olds & Lowe, PLLC

(57) ABSTRACT

A micro-optic lens is disclosed. The micro-optic lens includes a substrate; and a lens element on the substrate, wherein the lens element includes a flat surface and an annularly grooved surface including first facets and second facets, and wherein the first facets collimate a light effectively and the second facets are parallel to a light. The micro-optic lens can decrease the draft loss and collimate the emitted light beams to increase the light efficiency. Further, the present invention also provides a method for designing angles of micro-optic lenses.

21 Claims, 8 Drawing Sheets

US 7,914,174 B2

METHOD TO OPTIMIZE MICRO-OPTIC LENS IN LED FLASHLIGHT APPLICATION

BACKGROUND OF THE INVENTION

1. Field of the Invention

The present invention relates to lamps and other illumination devices, and in particular relates to LDE-based lamps using a novel Fresnel lens.

2. Description of the Related Art

A typical machine vision system consists of an illuminator, a camera, and a control system for enabling the illuminator and camera in combination to capture an image of an object which is under inspection and for processing the image and initiating a desired action. The action may be marking the product as acceptable or rejected. The illuminator is an important part of the system, and properties of illumination such as brightness, uniformity, angle of incidence, color, and degree of collimation can have a significant influence on the overall performance of the vision system. Additionally, the physical size of the illuminator is very important, as for some vision systems, there is very little physical space available for the illuminator. Several types of illuminators have been used within machine vision systems. For example, types of illuminators include incandescent bulbs, fluorescent tubes, lasers, Xenon flash tubes, halogen bulbs combined with fibre light guides, and light emitting diodes (LEDs). Of the illuminators, LEDs have become increasingly popular due to their relative lower costs, smaller sizes, longer operating lifespan, faster switching speeds and efficiency.

Augustin Fresnel, for whom the Fresnel lens is named, constructed a lens in which the center of the curvature of different rings recedes from an axis according to center distances, so as to practically eliminate spherical aberration. Fresnel lenses are used as light condensers, illuminators, and magnifiers, among other ways. Fresnel lenses basically consist of a series of concentric prismatic grooves, designed to cooperatively direct incident light rays to a common focus. This type of lens is thin, lightweight, and of high aperture.

Generally, for prior art thin Fresnel lenses used for visible light applications, the grooves are all the same width, so that the groove density is constant across the lens. Meanwhile, conventionally, a lens-type LED package well-known in the art, uses a light emitting element as a light source and is designed to radiate light emitted from the light emitting element in a predetermined direction while controlling its lighting distribution by using an optical system.

However, in the lens-type LED package, it is impossible to secure a same angle of the lens surface to the light emitting element when it is provided with an optical surface shape to enhance the convergence performance. Therefore, high efficiency of external radiation cannot be achieved as only about 30% of light emitted from the light emitting element can be controlled.

FIGS. 1A and 1B are cross-sectional views illustrating a structure of an LED package using a conventional Fresnel lens. As shown in FIG. 1A, an LED package 10 is composed of an LED 12 as a light source and a lens 14 to converge radiating light emitted from the LED 12. As shown in FIG. 1B, the lens 14 includes facet surfaces 142 and draft surfaces 144, and the draft surfaces has a vertical angle (90°) which are perpendicular to the horizontal surface. Generally, when the light L emitted form LED 12 passes through the facet surfaces 142, only some portions of the light are collimated to a substantially parallel light so that it is difficult to collimate all portions of the light effectively. Further, if the light L passes through the draft surface 144, the light cannot be collimated and becomes a scattered light, which is normally called draft loss. Additionally, the conventional structure of the lens 14 is only designed for a point light source, so poor collimation effect is seen for an area light source.

Thus, a novel method and a Fresnel lens structure are required to mitigate the previously mentioned problems.

BRIEF SUMMARY OF THE INVENTION

The present invention provides a micro-optic lens, comprising: a substrate; and a lens element on the substrate, wherein the lens element includes a flat surface and an annularly grooved surface comprising first facets and second facets, and wherein the first facets collimate light beam, and the second facets are substantially parallel to a light beam emitted from the light source.

The present invention further provides a light emitting diode package, comprising: a light emitting device having a light source; and an optical section surrounding the light emitting device. The optical section comprises a micro-optic lens, and the micro-optic lens comprises: a substrate; and a lens element on the substrate, wherein the lens element includes a flat surface and an annularly grooved surface comprising first facets and second facets, and wherein the first facets collimate light and the second facets are parallel to a light emitted from the light source.

The present invention further provides a method for designing angles of micro-optic lenses, comprising: providing a light source; providing a lens element having first facets and second facets; optimizing the first facets to collimate light beam effectively and designing the second facets almost parallel to a light beam emitted from the light source.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
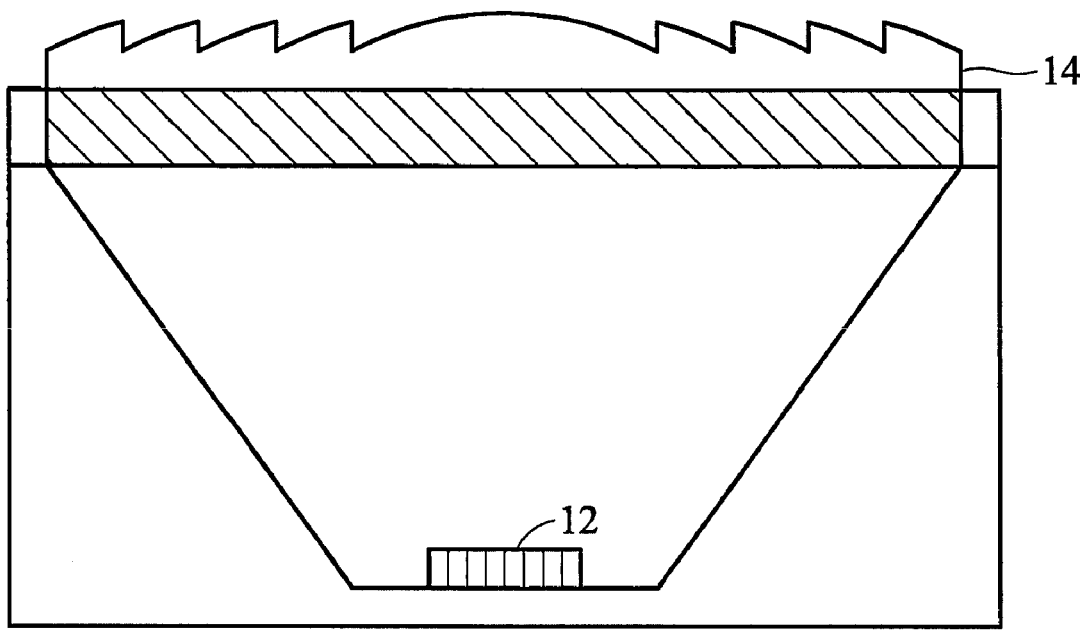
FIGS. 1A-1B are cross section of a prior art Fresnel lens.
Figure 1B:
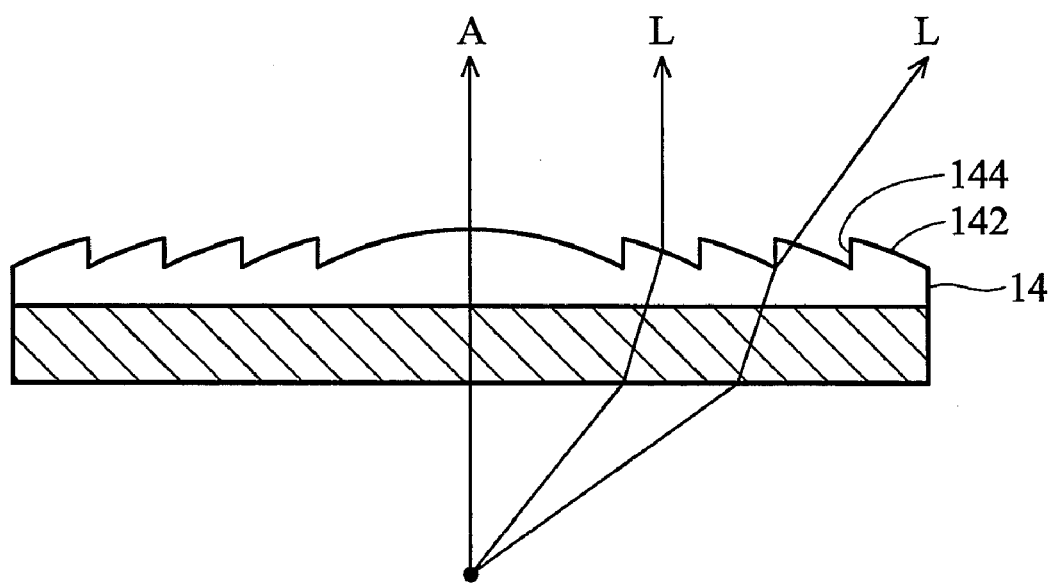
Figure 2:
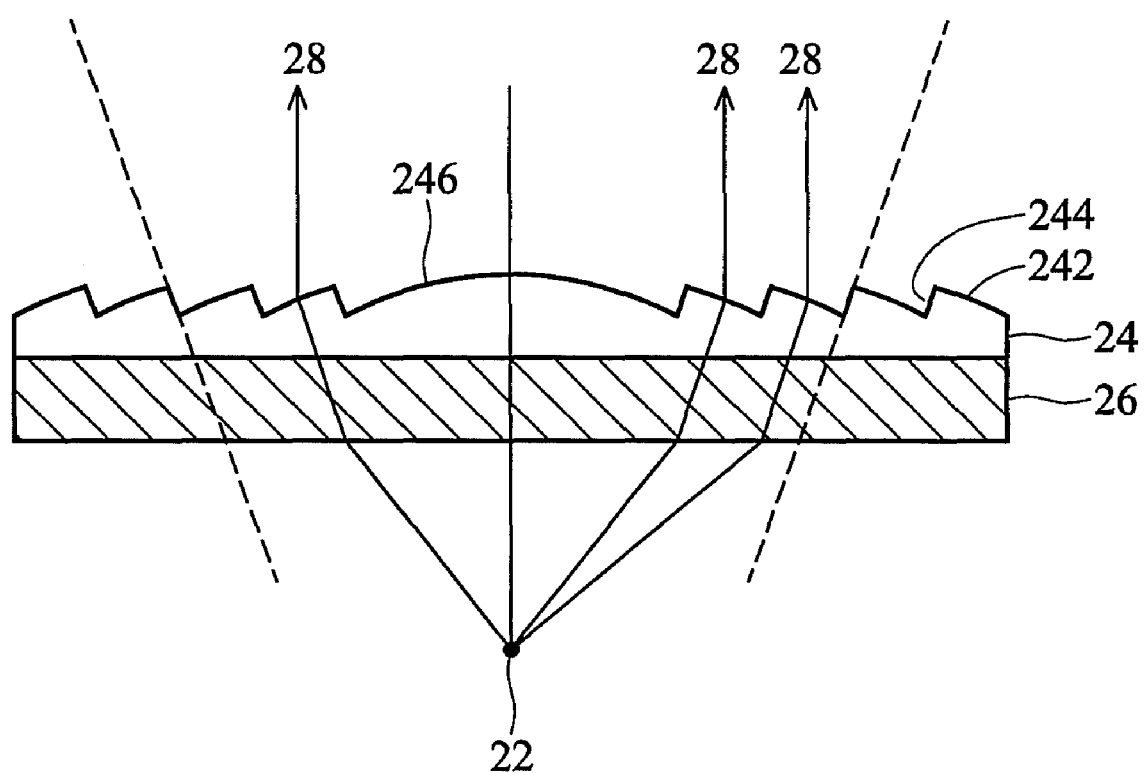
FIG. 2 is a cross section of a micro-optic lens according to an embodiment of the invention.
Figure 3:
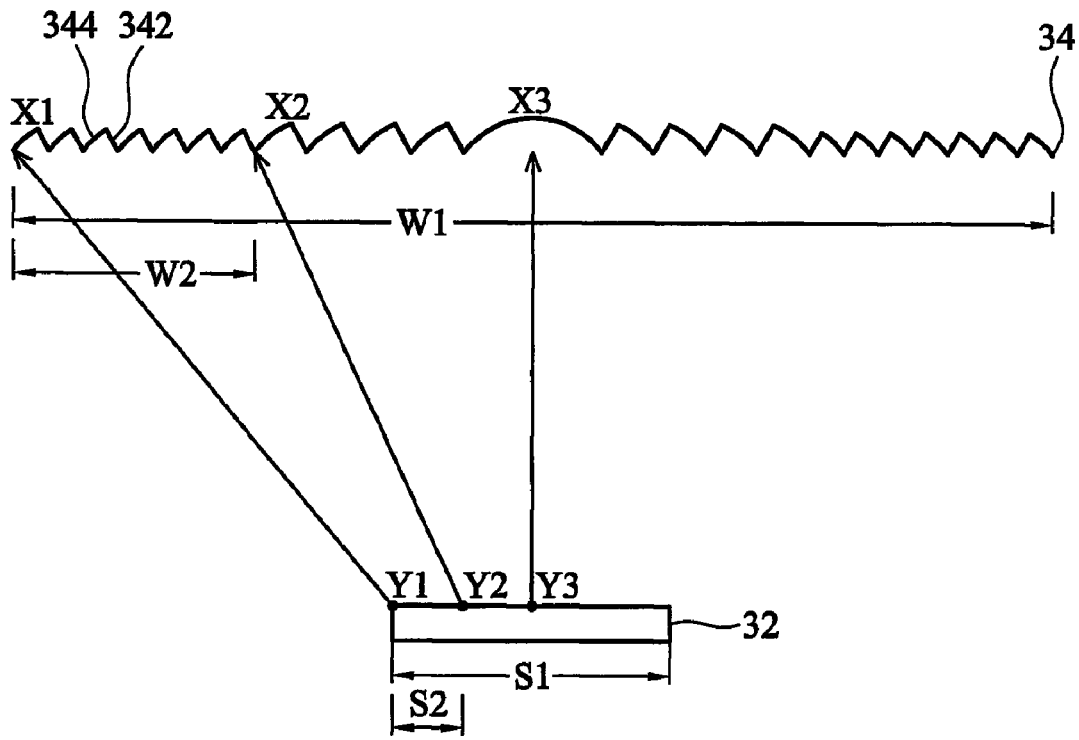
FIG. 3 is a cross section of a micro-optic lens according to another embodiment of the invention.
Figure 4:
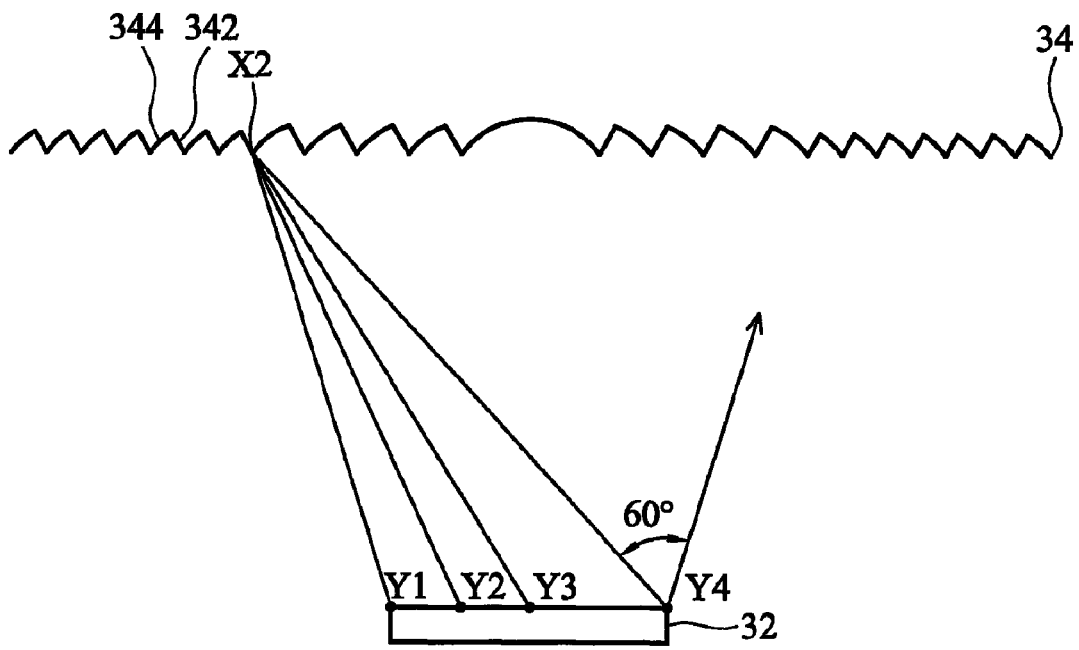
FIG. 4 is a cross section of a micro-optic lens according to another embodiment of the invention.

FIGS. 2-4 illustrate embodiments of a micro-optic lens according to the invention. It should be understood that the drawings herein are made in simplicity, and are utilized for illustrating associated elements related to the invention. In practical usage however, the semiconductor package is more complexly structured.

In one aspect of the invention, a micro-optic lens for a point light source is provided. The micro-optic lens of the present invention comprises a substrate; and a lens element on the substrate, wherein the lens element includes a flat surface and an annularly grooved surface comprising first facets, and second facets, and wherein the first facets collimate light and the second facets are parallel to a light. The micro-optic lens of the present invention can decrease draft loss and collimate the emitted light to increase light efficiency. The light efficiency of the micro-optic lens of the invention is above 80%, preferably above 85%.

Referring to FIG. 2, the lens (Fresnel lens) 24 is formed on a surface of an available transparent cover (e.g. a glass slice) 26. Preferably, the lens 24 is an optical grade of acrylic plastic as known in the art. The material can be an acrylic having a specific molding grade "RAHVS" which is Rohm and Haas VS optical grade acrylic. However, other materials and molding grades may be used, and nonacrylic materials with low dispersions may be substituted. The materials provide axial chromatic aberration correction and exhibit favorable molding qualities. This lens 24 has a thin circular body, with a flat surface and a grooved surface. The grooves nearer to the center 246 of the lens 24 can be wider than the grooves nearer to the circumference of the lens 24.

The lens 24 includes a facet surface 242 having a facet angle and draft surface 244 having a draft angle. A point light source 22, such as an LED, is provided and emits a light beam 28 which passes through the glass 26 and the lens 24. It should be noted that the draft surface 244 of the present invention is designed and formed to be almost parallel to the incidence light (light beam) 28 emitted from the light source 22. Specifically, the angle of incidence light and the draft angle are the same. And the facet surface 242 of the present invention is optimized to collimate the incidence light (light beam) 28 emitted from the light source 22 effectively. Draft loss can be decreased and the light beam 28 emitted from the LED can be collimated by the facet surfaces to increase light efficiency due to the draft surface 244 of the present invention being almost parallel to the light beam 28.

Additionally, the present invention further provides a micro-optic lens for an area light source. In one embodiment, an angle of draft surface can be designed depended upon a light emitted from a position of a light source. Light source 22, such as an LED, can be an area light source as shown in FIG. 3. The lens 34 has a length W1, and the area light source 32 has a length S1. The lens 34 includes facet surfaces 344 and draft surfaces 342, and the angles of the facet surfaces 344 and the draft surfaces 342 can be designed dependant upon the different positions. For example, the angels of the facet surface (facet angle) and the draft surface (draft angle) at position X1, X2, and X3 (center) are respectively different. The facet angle and the draft angle of the position X1 is designed by the light beam of the position Y1 on the LED so that the facet surface 344 of the position X1 can collimate the light emitted from the position Y1 of the LED, and draft surface 342 of the position X1 can be parallel to the light emitted from the position Y1 of the LED. Similarly, the facet angle and the draft angle of position X2 is also designed by the light beam of the position Y2 on the LED so that the facet surface 344 of the position X2 can collimate the light emitted from the position Y2 of the LED, and the draft surface 342 of the position X2 can be parallel to the light emitted from the position Y2 of the LED. It should be noted that the position X1, X2, Y1, and Y2 are associated within a specific relationship. The distance between the positions X1 and X2 has a length W2, the distance between positions Y1 and Y2 has a length S2, and the ratio of W1/W2 is equal to the ratio of S1/S2.

In another embodiment, angles of the facet surfaces and the draft surfaces can be designed dependant upon an average of a plurality light beams emitted from various positions. Referring to FIG. 4, the facet angle and the draft angle on the position X2 can be designed by the light beams emitted from various positions including Y1, Y2, Y3 and Y4 on the LED. Assume that each light has an emission angle of 60°. Since, the facet angle and the draft angle on the position X2 can be designed based on the average angle of the light emitted from various positions, such as Y1, Y2, Y3 and Y4, the facet surface on the position X2 can be almost simultaneously collimate the light emitted from the positions Y1, Y2, Y3 and Y4, and the draft surface on the position X2 can be almost simultaneously parallel to the light emitted from the positions Y1, Y2, Y3 and Y4. Other facet and draft angles of the lens 34 may be deduced from the previous example.

Figure 5:
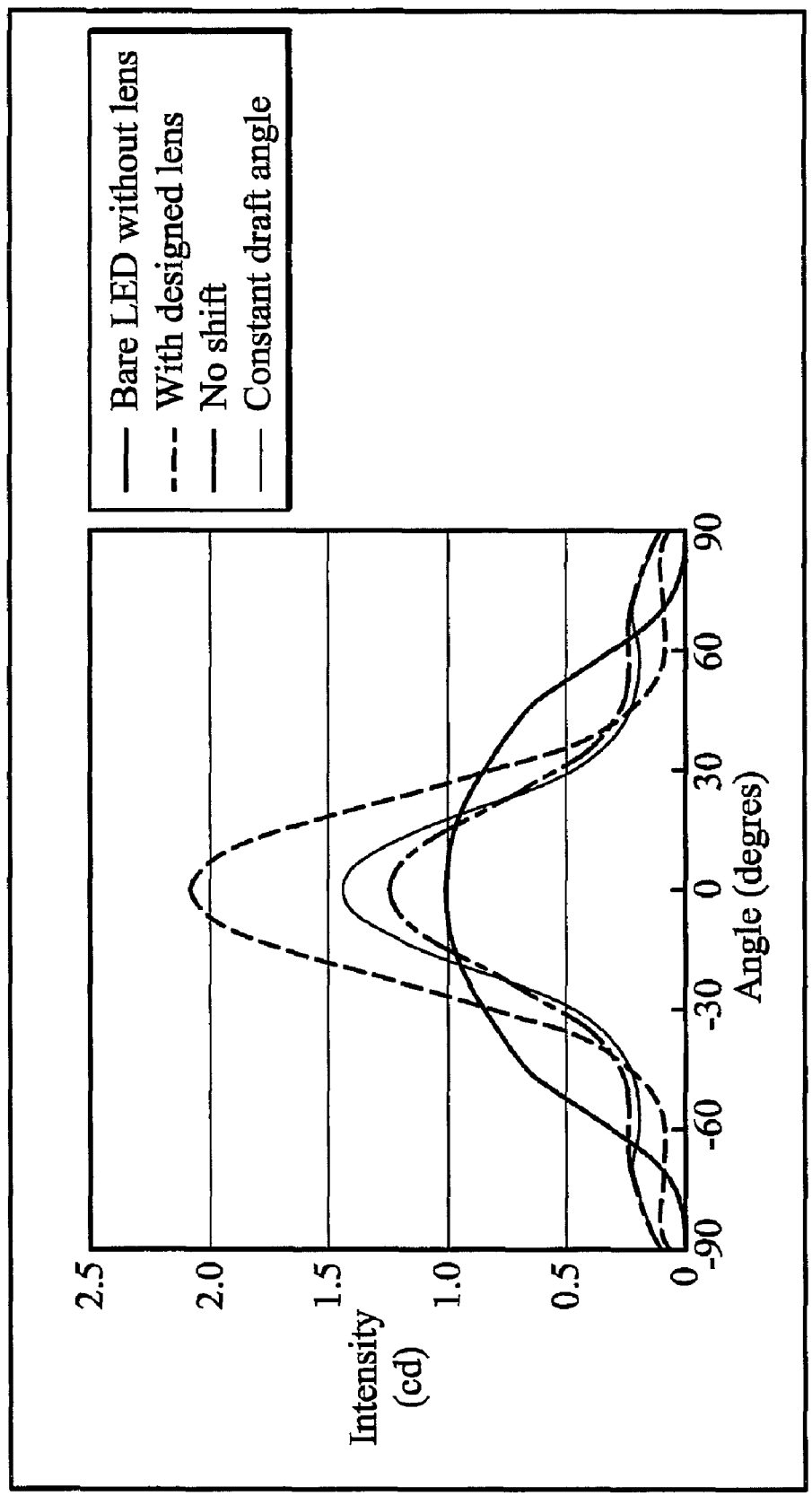
FIG. 5 is a graph plotting luminance intensity against divergence angle of the light beams.

FIG. 5 is a graph plotting luminance intensity against divergence angle of the light beams. Referring to FIG. 5, there were four kinds of LED devices analyzed, which include: (1) a bare LED without a lens; (2) an LED with a designed lens of the present invention (the facet angles and the draft angles are gradual change); (3) an LED with no shift lens (the surface angle on lens is designed by the LED central point); and (4) an LED with lens having a constant draft angle. The LED with the designed lens of the present invention had the largest luminance intensity as compared to other conventional LED devices. The results indicated that the lens of the present invention can significantly converge and collimate the light beam(s) emitted from an area light source (or point light source) to improve the light efficiency (89.4%).

Figure 6:
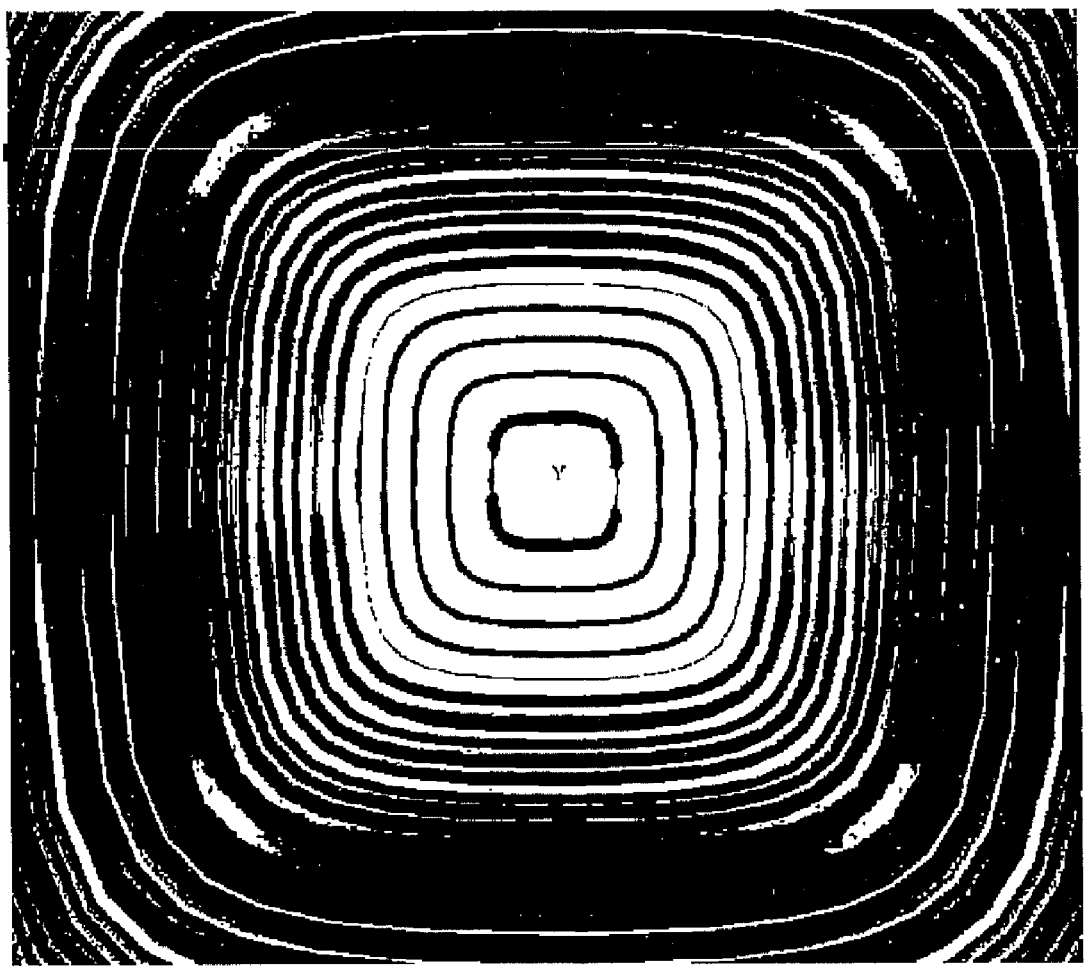
FIG. 6 is a top view of a micro-optic lens with rectangular shape according to an embodiment of the invention.
Figure 7:
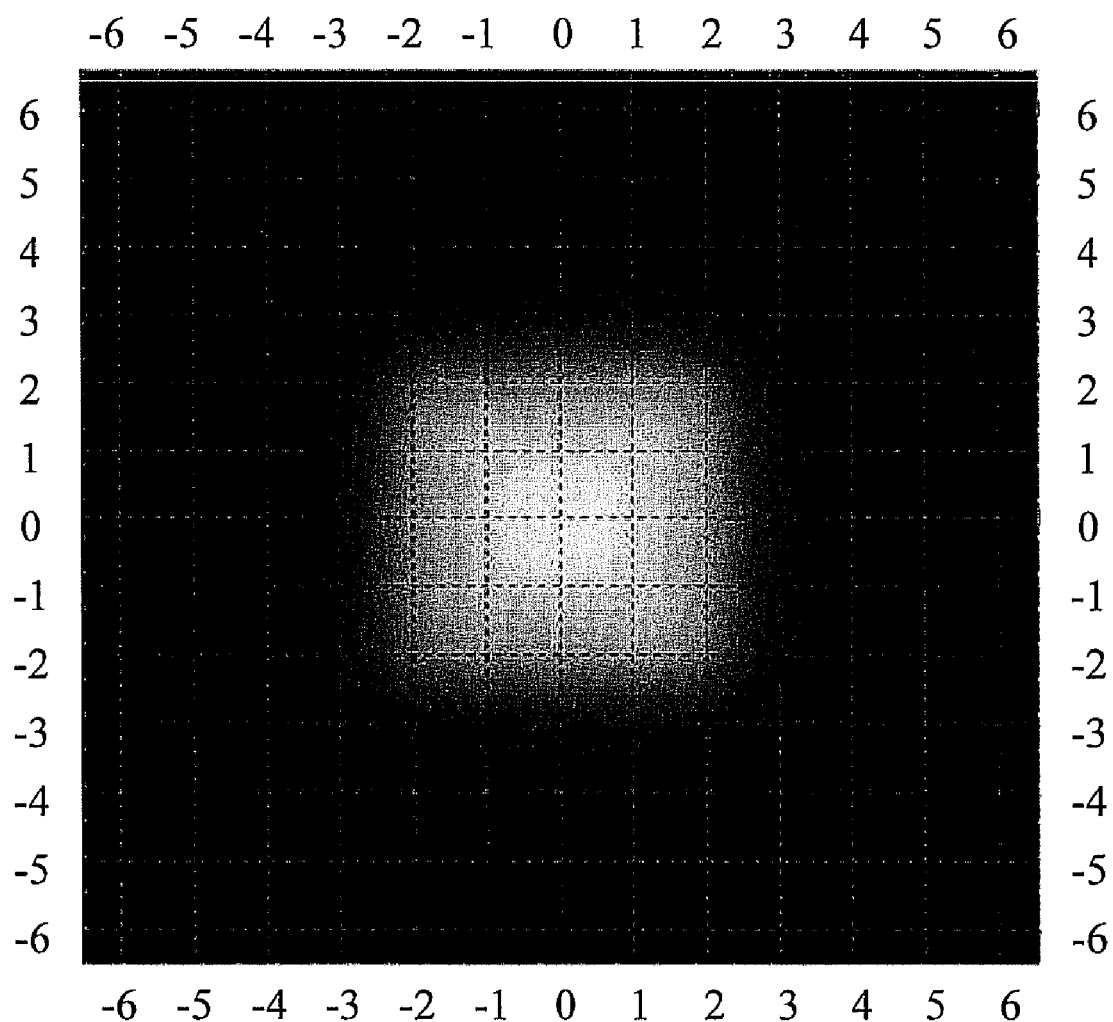
FIG. 7 is a graph plotting the profile of the light beam after passing through a micro-optic lens of the invention.
Figure 8:
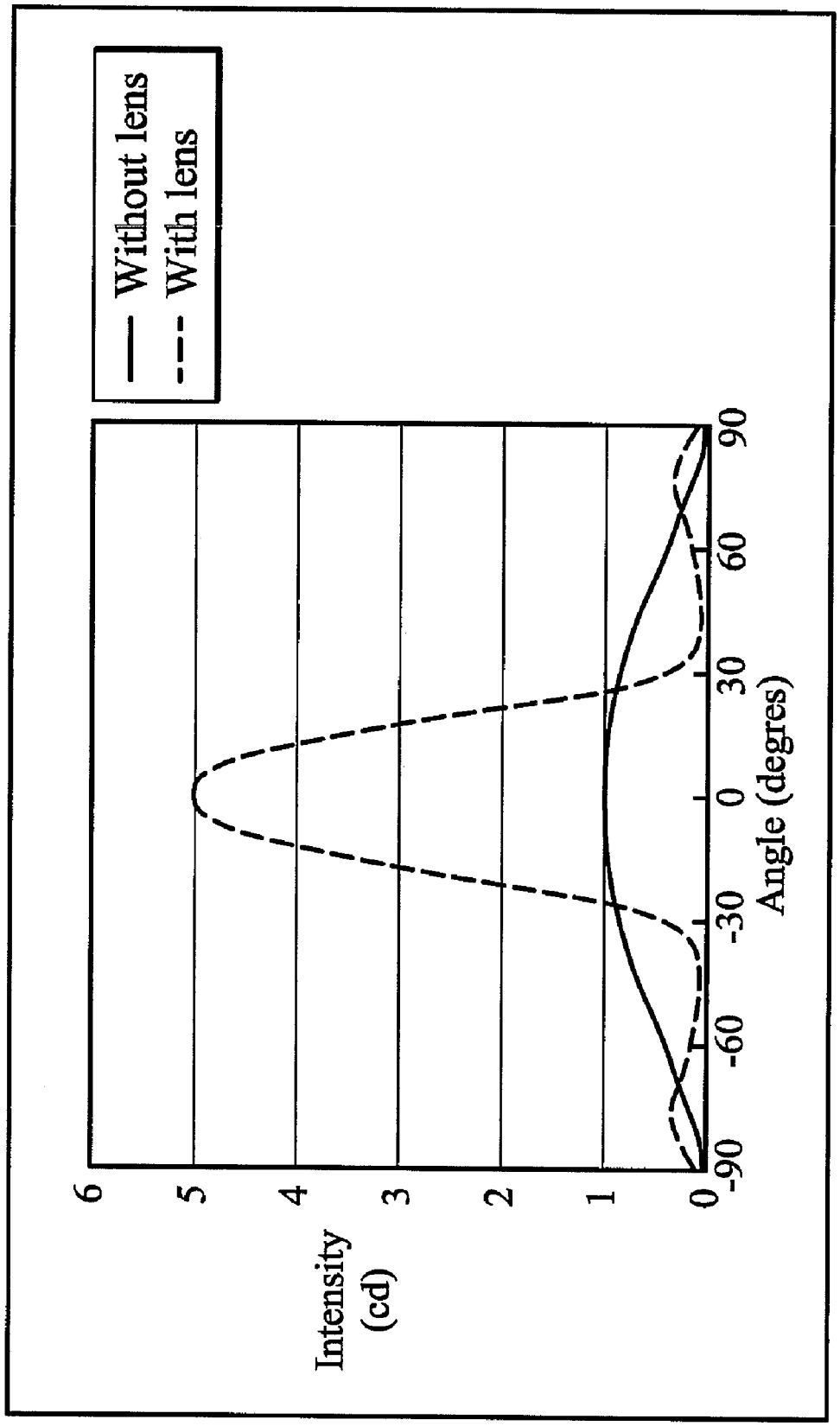
FIG. 8 is a graph plotting luminance intensity against divergence angle of the light beams.

Further, the lens shape can be changed to control the profile of the emitted light. The shape of the lens can be circular, square, rectangular, polygonal or other suitable shape. In one embodiment, the conventional LED device without lens produced a light having a circular profile. However, the profile of the light can be changed to a rectangular profile using a rectangular lens of the present invention as shown in FIGS. 6 and 7. Referring to FIG. 8, the LED with the designed lens with rectangular shape of the present invention also showed a relatively high light efficiency (89.2%).

In another aspect of the invention, a method for fabricating micro-optic lens is provided. The method of fabricating a three-dimensional micro-optic lens, comprises: providing a substrate; providing a photomask; exposing the mask to an electron beam of selected charge density to provide a predetermined gray scale pattern on the mask; exposing the photoresist layer to radiation transmitted through the mask; and removing the material of the photoresist layer and the substrate to provide a lens element on the substrate by the gray scale patterns, wherein the lens element includes a flat surface and an annularly grooved surface comprising at least one first facet, and at least one second facet, and wherein the second facets are parallel to a light.

FIG. 9 is cross-sectional views illustrating an embodiment of a method for fabricating the micro-optic lens of the present invention. It should be understood that the drawings herein are made in simplicity, and are utilized for illustrating associated elements related to the invention.

Figure 9A:
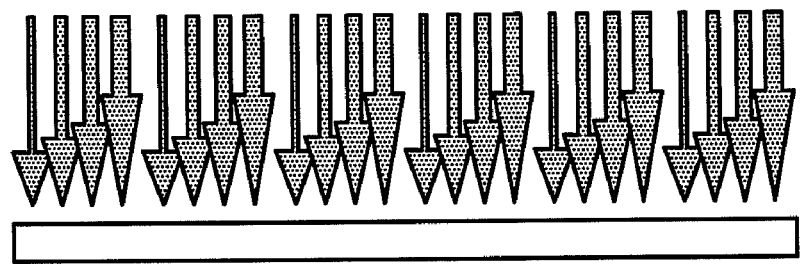
FIGS. 9A-9E are cross-sectional views illustrating an embodiment of a method for fabricating the micro-optic lens of the present invention.
Figure 9B:

Referring to FIG. 9a, a gray level mask, such as an HEBS-glass gray level mask, is provided. The gray scale mask comprises a structure formed of a base glass such as a low expansion zinc-boro-silicate glass or a so-called white crown glass. The base glass composition also contains alkali to facilitate an ion exchange reaction which achieves sensitivity of the glass composition to high energy beams. After ion exchange, the glass material becomes alkali-free as a result of the ion exchange process, which is typically carried out in an acidic aqueous solution at temperatures above 320° C. The base glass composition comprises silica, metal oxides, nitrates, halides and photo inhibitors. Typically, $TiO_2$, $Nb_2O_5$ or $Y_2O_3$ are used as photo inhibitors. After e-beam exposure, the mask needs no further development or fixation process. The mask with multiple levels of optical densities can then be used to expose a photoresist in a contact aligner or in a reduction stepper as shown in FIG. 9b.

Figure 9C:
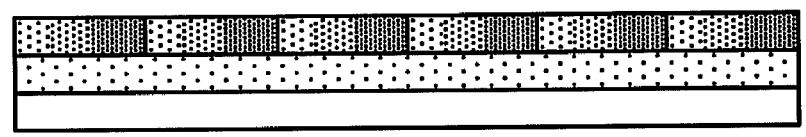
Figure 9D:
Figure 9E:

FIG. 9c-9d shows the relationship between resist thicknesses after development with each optical density. The result of the relationships was used to determine the e-beam dosages for each of the phase levels necessary to generate the optical elements. The generated gray level mask can be used to expose numerous optical elements using an optical lithography tool. After many copies of the mask on the photoresist were developed, many substrates with the developed photoresist were placed in an etching system, to simultaneously transfer the microstructures from the analog resists onto the surfaces of the substrates as shown in FIG. 9e. The method of fabricating the Fresnel lens is known in the art, and one of ordinary skill in the art will select the appropriate method and protocol to use the Fresnel lens. These and many other methods will be readily apparent to those of ordinary skill in the art, and are considered as equivalents within the scope of the present invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro-optic lens, comprising a substrate; and a lens element on the substrate, wherein the lens element includes a flat surface and an annularly grooved surface comprising first facets and second facets, wherein the first facets collimate a light, and second facets are substantially parallel to the light.

2. The micro-optic lens as claimed in claim 1, wherein the light is emitted from a light source.

3. The micro-optic lens as claimed in claim 1, wherein the first facet is a facet surface of a Fresnel lens.

4. The micro-optic lens as claimed in claim 1, wherein the second facet is a draft surface of a Fresnel lens.

5. The micro-optic lens as claimed in claim 1, wherein a shape of the micro-optic lens comprises a circular, a square, a rectangular, an oblongated, a triangular, or polygonal shape.

6. The micro-optic lens as claimed in claim 1, wherein the substrate is a glass.

7. The micro-optic lens as claimed in claim 1, wherein the lens is a photoresist, acrylic or plastic material.

8. A light emitting diode package, comprising:
a light emitting device having a light source; and
an optical section surrounding the light emitting device, wherein the optical section comprises a micro-optic lens, and the micro-optic lens comprises:
a substrate; and a lens element on the substrate, wherein the lens element includes a flat surface and an annularly grooved surface comprising first facets and second facets, and wherein the first facets collimate a light and second facets are substantially parallel to a light emitted from the light source.

9. The light emitting diode package as claimed in claim 8, wherein the first facets are facet surfaces of a Fresnel lens.

10. The light emitting diode package as claimed in claim 8, wherein the second facets are draft surfaces of a Fresnel lens.

11. The light emitting diode package as claimed in claim 8, wherein the light source is a point light source.

12. The light emitting diode package as claimed in claim 11, wherein the first facets collimate the light emitted from the point light source effectively.

13. The light emitting diode package as claimed in claim 11, wherein the second facets are almost parallel to the light emitted from the point light source.

14. The light emitting diode package as claimed in claim 8, wherein the light emitting device is an area light source.

15. The light emitting diode package as claimed in claim 14, wherein the second facets are almost parallel to light beams simultaneously emitted from different positions on the area light source.

16. The light emitting diode package as claimed in claim 8, wherein a shape of the micro-optic lens comprises a circular, a square, a rectangular, an oblongated, a triangular, or polygonal shape.

17. The light emitting diode package as claimed in claim 8, wherein the substrate is a glass.

18. The light emitting diode package as claimed in claim 8, wherein the light source is an LED.

19. A method for designing angles of micro-optic lens, comprising
providing a light source;
providing a lens element having first facets and second facets;
optimizing the first facets to collimate light beam effectively; and
designing second facets almost parallel to a light beam emitted from the light source.

20. The method as claimed in claim 19, wherein the light source is an area light source, and the first facets and second facets are designed by a particular light beam emitted from a particular position on the light source.

21. The method as claimed in claim 19, wherein the light source is an area light source, and the first facets and second facets are designed by an average of a plurality light beams emitted from various positions on the light source.

* * * * *